(12) United States Patent
Blum

(10) Patent No.: US 8,100,600 B2
(45) Date of Patent: Jan. 24, 2012

(54) PIVOTING CONNECTOR ASSEMBLY FOR CONNECTING TWO MEMBERS

(75) Inventor: Carl Stewart Blum, Johns Island, SC (US)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 12/257,032

(22) Filed: Oct. 23, 2008

(65) Prior Publication Data
US 2010/0102011 A1 Apr. 29, 2010

(51) Int. Cl.
*F16B 9/00* (2006.01)
(52) U.S. Cl. .......................... 403/256; 403/257; 403/388
(58) Field of Classification Search .......... 403/252–255, 403/264
See application file for complete search history.

(56) References Cited

U.S. PATENT DOCUMENTS

| | | | |
|---|---|---|---|
| 2,517,308 A | | 8/1950 | Harrs |
| 3,901,612 A | * | 8/1975 | Canin ........................... 403/189 |
| 4,108,422 A | * | 8/1978 | Fleischmann ................... 256/67 |
| 4,204,375 A | | 5/1980 | Good |
| 4,911,348 A | | 3/1990 | Rasor et al. |
| 5,265,972 A | * | 11/1993 | Bahr ............................. 403/252 |
| 5,729,948 A | * | 3/1998 | Levy et al. .................... 52/656.9 |
| 5,746,535 A | * | 5/1998 | Kohler .......................... 403/258 |
| 5,785,359 A | * | 7/1998 | Nagai et al. .................... 285/191 |
| 5,890,524 A | * | 4/1999 | Tucker et al. ................. 144/371 |
| 6,059,322 A | * | 5/2000 | Nagai et al. ................. 285/125.1 |
| 6,086,300 A | * | 7/2000 | Frohlich ......................... 411/84 |
| 6,331,092 B1 | * | 12/2001 | Linger ........................... 403/382 |
| 6,382,866 B1 | * | 5/2002 | Zihlmann ...................... 403/255 |
| 6,478,501 B1 | * | 11/2002 | Kahl ............................. 403/255 |
| 6,481,177 B1 | * | 11/2002 | Wood ............................ 52/656.9 |
| 6,647,590 B2 | * | 11/2003 | Haab et al. ........................ 16/90 |
| 6,712,254 B2 | | 3/2004 | Oetlinger |
| 6,712,540 B2 | | 3/2004 | Schmalzhofer et al. |
| 6,712,543 B1 | | 3/2004 | Schmalzhofer |
| 6,764,245 B2 | * | 7/2004 | Popovski ...................... 403/256 |
| 6,827,320 B2 | * | 12/2004 | Yeh .......................... 248/220.22 |
| 6,935,804 B2 | * | 8/2005 | Karlinger ...................... 403/252 |
| 6,942,132 B2 | | 9/2005 | Oetlinger |

(Continued)

FOREIGN PATENT DOCUMENTS
DE 10146492 A1 * 4/2003

OTHER PUBLICATIONS
Star Linear Systems, Super Structure Components for Modular Profile Construction Kit, Mannesmann Rexroth Catalog RA 99 009, Dec. 1996, 3 pages.

(Continued)

*Primary Examiner* — Daniel Stodola
*Assistant Examiner* — Daniel Wiley
(74) *Attorney, Agent, or Firm* — Michael Best & Friedrich LLP

(57) ABSTRACT

A connector is configured to connect two frame members. The connector includes a body with a first end and a second end spaced from the first end. A fulcrum is coupled to the body between the first end and the second end. The body is configured to be received in a channel of a frame member and pivots about the fulcrum inside the channel between a first pivot position in which the frame members are free to move relative to one another and a second pivot position in which the frame members are locked against relative movement.

16 Claims, 8 Drawing Sheets

U.S. PATENT DOCUMENTS

| | | | | |
|---|---|---|---|---|
| 7,293,935 | B2* | 11/2007 | Band et al. | 403/254 |
| 7,444,922 | B2* | 11/2008 | Harashima et al. | 92/59 |
| 7,621,487 | B2* | 11/2009 | Brown et al. | 248/65 |
| 2002/0044824 | A1* | 4/2002 | Haab et al. | 403/389 |
| 2002/0122691 | A1* | 9/2002 | Wood | 403/381 |
| 2003/0152422 | A1* | 8/2003 | Popovski | 403/255 |
| 2008/0232897 | A1* | 9/2008 | Stauss | 403/205 |

OTHER PUBLICATIONS

Aluminum Structural Framing System, Rexroth Bosch Group Catalog 8 891 500 201, Oct. 2007, 3 pages.

Bosch Rexroth Aluminum Framing Shop, Retrieved Apr. 28, 2008, from http://www.13.boschrexroth-us.com/framing_shop/, 1 page.

* cited by examiner

PIVOTING CONNECTOR ASSEMBLY FOR CONNECTING TWO MEMBERS

FIELD OF THE INVENTION

The present invention relates to connectors, and more particularly to connectors for use in connecting two frame members.

BACKGROUND OF THE INVENTION

It is known to connect frame members with connectors. Many connectors exist in the prior art that can be used to quickly and efficiently assemble and disassemble frame members. In particular, many connectors exist specifically for joining profiled bars or frame members with peripheral channels formed therein. The connectors of the prior art couple two frame members together by inserting the connector pieces in the channels of the profiles and using screws or other fasteners to hold the connector pieces together. Generally, each connector in the prior art allows the user to connect two frame members in one particular configuration. For example, one connector may provide an end-to-end connection while another connector may provide a perpendicular connection. The location of the connectors is generally fixed once the connectors are installed into the frame members.

Many connectors also include external features (e.g., plates) that fit on the outside of the profiles. These connectors may offer additional flexibility such as allowing two frame members to be joined at different angles using the same connector. However, the external features do not allow two frame members to be located flush against one another. The external features introduce additional spaces between frame members and make alignment with other frame members difficult if other connectors are used which do not contain external features.

SUMMARY OF THE INVENTION

The present invention relates to connectors and provides a connector that is internal to the frame members while still allowing the user to have maximum flexibility in positioning the two frame members. The present invention also provides a tight connection between two frame members, substantially locking the two frame members against any relative movement, including translational movement as well as rotational movement.

One embodiment of the present invention is directed to a connector configured to interconnect two frame members. The connector includes a connector member including a body and a fulcrum. The body has a first end and a second end spaced from the first end and is configured to be received within a channel in a first one of the two frame members. The fulcrum is coupled to the body between the first end and the second end and provides a pivot point about which the body can pivot within the channel of the first frame member to selectively lock the two frame members against relative movement.

Another embodiment of the present invention is an assembly having a first frame member including a channel, a second frame member, and a connector member interconnecting the first frame member and the second frame member. The connector member includes a body and a fulcrum. The body has a first end and a second end spaced from the first end and is received within the channel in the first frame member. The fulcrum is coupled to the body between the first end and the second end and provides a pivot point about which the body pivots within the channel of the first frame member to selectively lock the first and second frame members against relative movement.

Yet another embodiment of the present invention includes a method of connecting two frame members. The method includes inserting a connector member into a channel in a first frame member and coupling the connector member to a second frame member. The method further includes pivoting the connector member from a first pivot position within the channel, in which the frame members are free to move with respect to each other, to a second pivot position within the channel, in which the frame members are substantially locked against relative movement.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
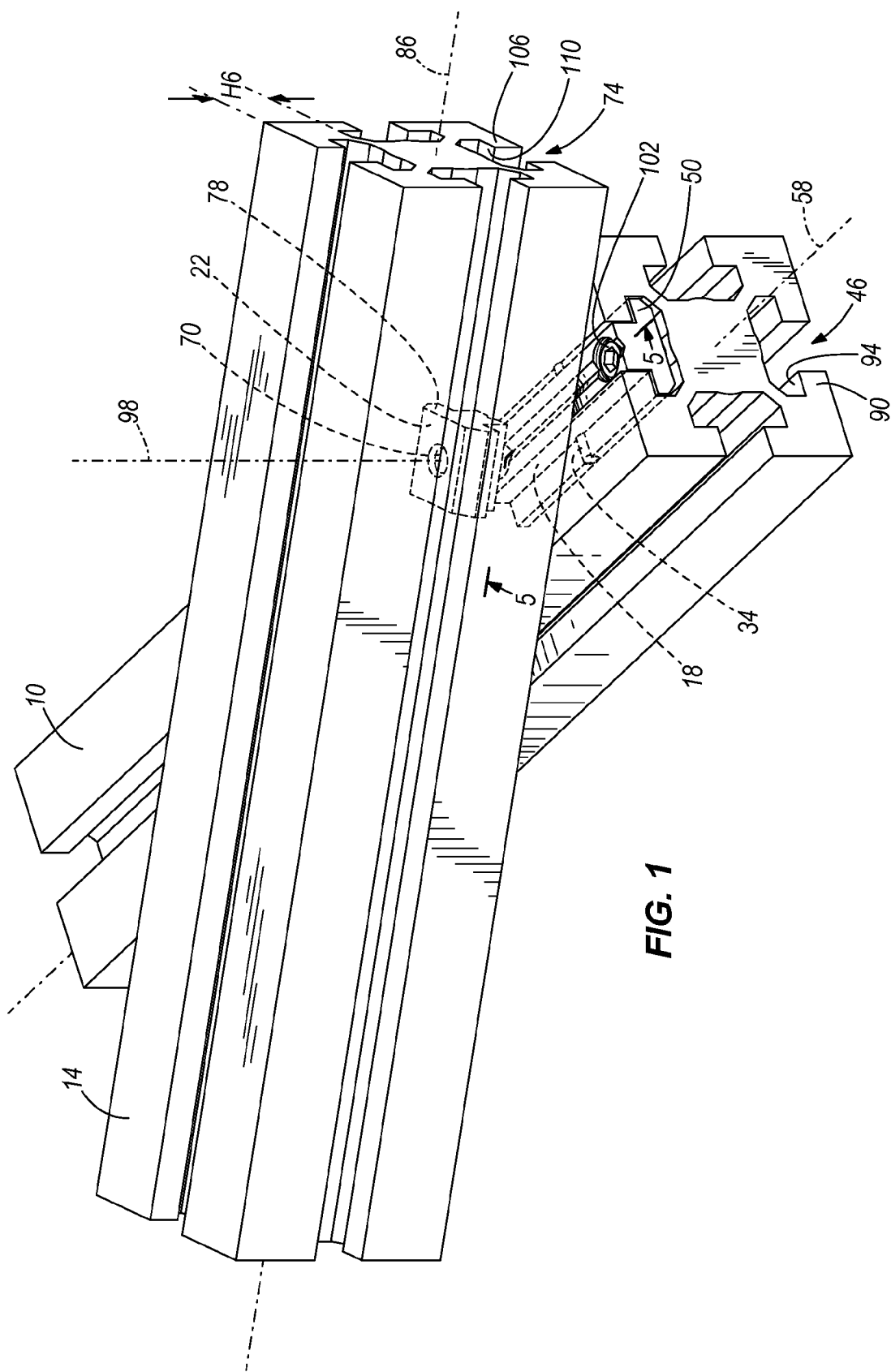
FIG. 1 is a perspective view of an assembly including a connector in accordance with the present invention, the assembly including two frame members, a connector member, and a tee nut.

FIG. 1 illustrates one embodiment of the present invention in which two substantially identical structural members or frame members 10, 14 are connected using a connector embodying the present invention. Although the present embodiments are described with respect to frame members, it is not necessary that the present invention be used to build frames. A connector in accordance with the present invention may be used to connect any two members, as long as they are rigid enough to sustain the locking action produced from pivoting of the connector member, as described below. Thus, the use of the term "frame members" herein and in the appended claims is intended to include any structural members (e.g., profiled bars, cabinets, boxes, etc.) although not necessarily used to construct a frame. The individual components of the assembly shown in FIG. 1 include a connector member 18, a tee nut 22, and the frame members 10, 14, which are shown in greater detail in FIGS. 2-4.

Figure 2:
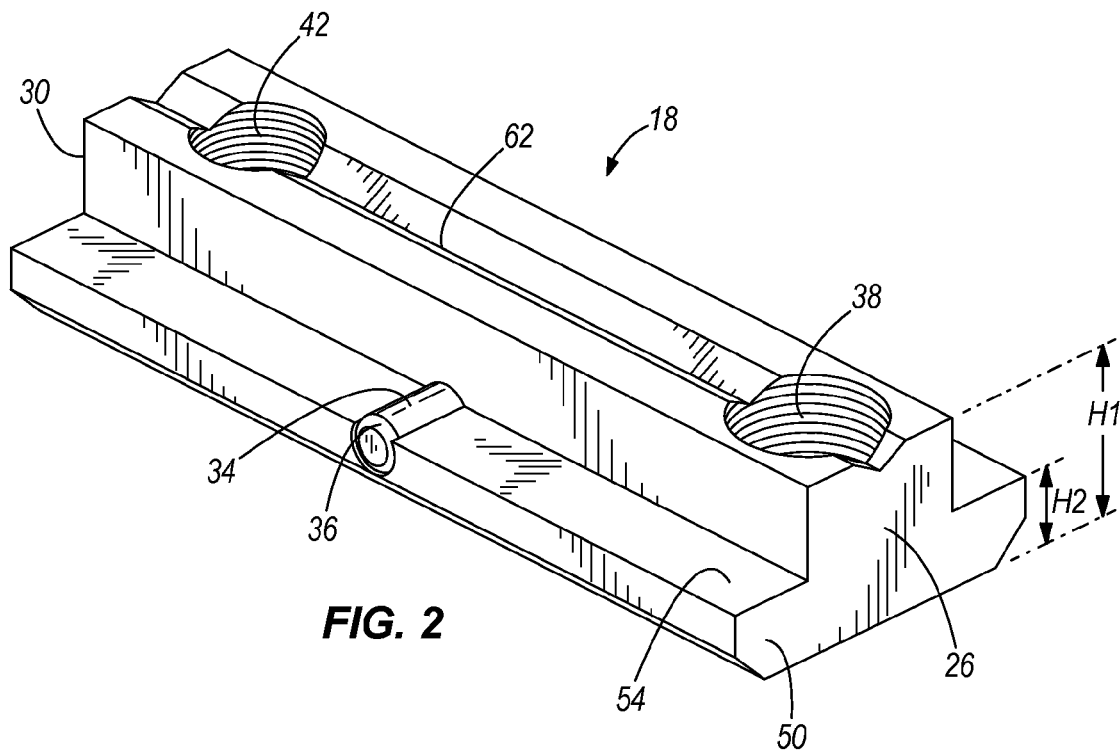
FIG. 2 is a perspective view of the connector member of FIG. 1.

With reference to FIG. 2, the connector member 18 has a body with a first end 26 spaced apart from a second end 30, and a fulcrum 34 located between the first end 26 and the second end 30. In the illustrated embodiment, the fulcrum 34 is formed by a dowel pin 36 inserted in an aperture in the body. One skilled in the art will understand that there are many ways to form a fulcrum 34 on the connector member 18. In some embodiments, the fulcrum 34 may be formed using two dowel pins, inserted in an aperture on each side of the body. The apertures may be formed in the body of the connector member 18 when it is initially formed, or a portion of material may be removed from the body by any suitable process to form the apertures in the connector member 18 after it is initially formed. In other embodiments, the fulcrum 34 may be formed integrally with the connector member 18, or the fulcrum 34 may be formed of a suitable piece of material that is welded or otherwise attached to a flange 50 on the connector member 18 such that it functions as the fulcrum 34.

The connector member 18 further includes a first bore 38 adjacent the first end 26 and a second bore 42 adjacent the second end 30. In the illustrated embodiment, the bores 38, 42 are threaded to receive threaded fasteners, described in further detail below. The body of the connector member 18 has a cross-sectional shape that is substantially the same as a channel 46 in the first frame member 10 (see FIG. 1) such that the connector member 18 can be inserted into the channel 46 in the first frame member 10. The connector member has flanges 50 that define an exterior surface 54 of the connector member 18. The connector member 18 is inserted into the channel 46 of the first frame member 10. The exterior surface 54 communicates with an interior surface of the channel 46, which will be described below with reference to FIGS. 5 and 6. In the present embodiment, the connector member 18 has a substantially constant cross-sectional shape and as illustrated, a T-shape cross-section. Of course, it is not necessary that the connector member 18 be formed in a T-shape. The cross-sectional shape of the connector member 18 should generally correspond to the shape of the channel 46 in which it is slidably received.

The connector member 18 has a maximum height HI that is smaller than a height H4 (see FIG. 4) of the channel 46 in the first frame member 10. Therefore, no portion of the connector member 18 will extend outside the channel 46 in a direction perpendicular to a longitudinal axis 58 of the frame member 10 when the connector member 18 is inserted therein. The flange 50 of the connector member 18 has a height H2, which will be described below.

The connector member 18 may be formed by any suitable manufacturing process and may be formed of any suitable material such that it can withstand the forces generated when the two frame members 10, 14 are locked against relative movement, as described below. In the illustrated embodiment, an optional groove 62 extends longitudinally in the connector member 18 and is provided as an alignment aid for machining the connector member 18. Of course, the groove 62 may not be necessary if the connector member 18 is formed using a molding or casting process rather than a cutting or machining process.

Figure 3:
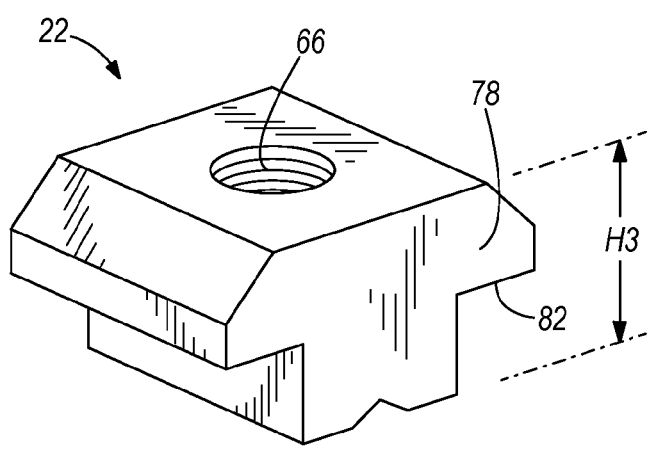
FIG. 3 is a perspective view of the tee nut of FIG. 1.

Referring now to FIG. 3, the tee nut 22 may also be referred to as a second connector member. However, in order to easily distinguish between the first connector member and the second connector member of the present embodiment, the second connector member will be referred to as a tee nut 22. It is important to note that the present invention does not require the use of a tee nut 22. In fact, the present invention does not require the use of a second connector member. The connector member 18 of the present invention may be coupled to the second frame member 14 in any suitable manner such that pivoting of the connector member 18 produces a locking action, described in detail with respect to FIGS. 5 and 6 below, to selectively lock the two frame members 10, 14 against relative movement. It is also important to note that the second frame member 14 may be any reasonable structure or enclosure member, such as a cabinet, electrical box, watertight box, explosion proof box, etc., that the connector member may be coupled with.

Referring to FIGS. 1 and 3, the tee nut 22 contains a threaded bore 66 in the body to receive a fastener 70 for coupling the connector member 18 to the tee nut 22. The tee nut 22 has a cross-sectional shape that is substantially the same as a channel 74 in the second frame member 14 such that the tee nut 22 can be inserted therein. The tee nut 22 has flanges 78 that define an exterior surface 82 of the tee nut 22.

When the tee nut 22 is inserted into the channel 74 of the second frame member 14, the exterior surface 82 communicates with an interior surface of the channel 74, which will be described below with reference to FIGS. 5 and 6. In the present embodiment, the cross-sectional shape of the tee nut 22 is substantially a T-shape. Of course, it is not necessary that the tee nut 22 be formed in a T-shape. The shape of the tee nut 22 should generally correspond to the shape of the channel 74 in which it is slidably received.

The tee nut 22 has a maximum height H3 that is smaller than a height H6 (see FIG. 1) of the channel 74 in the second frame member 14. Therefore, no portion of the tee nut 22 will extend outside the channel 74 in a direction perpendicular to a longitudinal axis 86 of the frame member 14 when the tee nut 22 is inserted therein.

Like the connector member 18, the tee nut 22 may be formed by any suitable manufacturing process or combination of processes. The tee nut 22 may also be formed of any suitable material such that it can withstand the forces generated when the two frame members 10, 14 are locked against relative movement, as described below.

In the illustrated embodiment shown in FIG. 1, the frame members 10, 14 are substantially the same. Therefore, only the first frame member 10 will be explained in detail with reference to FIG. 4. The first frame member 10 has a substantially rectangular cross-section with channels 46 formed along the entire length of each face. The channels 46 have a cross-sectional shape that is generally T-shaped in the present embodiment to receive the connector member 18. Because the channels 46 are T-shaped, flanges 90 are defined in the first frame member 10. The flanges 90 define interior surfaces 94 of the channels 46.

The first frame member 10 may be formed from any suitable material, depending on the desired application, such that it can withstand the forces generated when the two frame members 10, 14 are locked against relative movement, as described below. Also, the cross-sectional shape of the channels 46 may vary as long as the connector member 18 is of similar cross-sectional shape and may be slidably inserted in the channels 46. The frame members 10, 14 may be formed by any suitable manufacturing process or combination of processes. It is well known, for example, to form frame members 10, 14 by extrusion of aluminum. The aluminum profiles commonly used in industry provide light-weight, strong frame members that can be readily used with connectors embodying the present invention.

Other variations of frame members 10, 14 may also be used in connection with the present invention. For example, the channels 46, 74 of the frame members 10, 14 do not need to extend the entire length of the frame members 10, 14. The channels 46, 74 simply need to accommodate the connector members 18, 22. However, shortening of the channels 46, 74 limits the range of possible configurations of the two frame members 10, 14. In fact, the second frame member 14 does not need to contain channels 74. The second frame member 14 simply needs to be coupled to the first connector member 18 such that pivoting of the connector member 18 produces a locking action, substantially inhibiting relative movement between the two frame members 10, 14, as described below.

Figure 4:
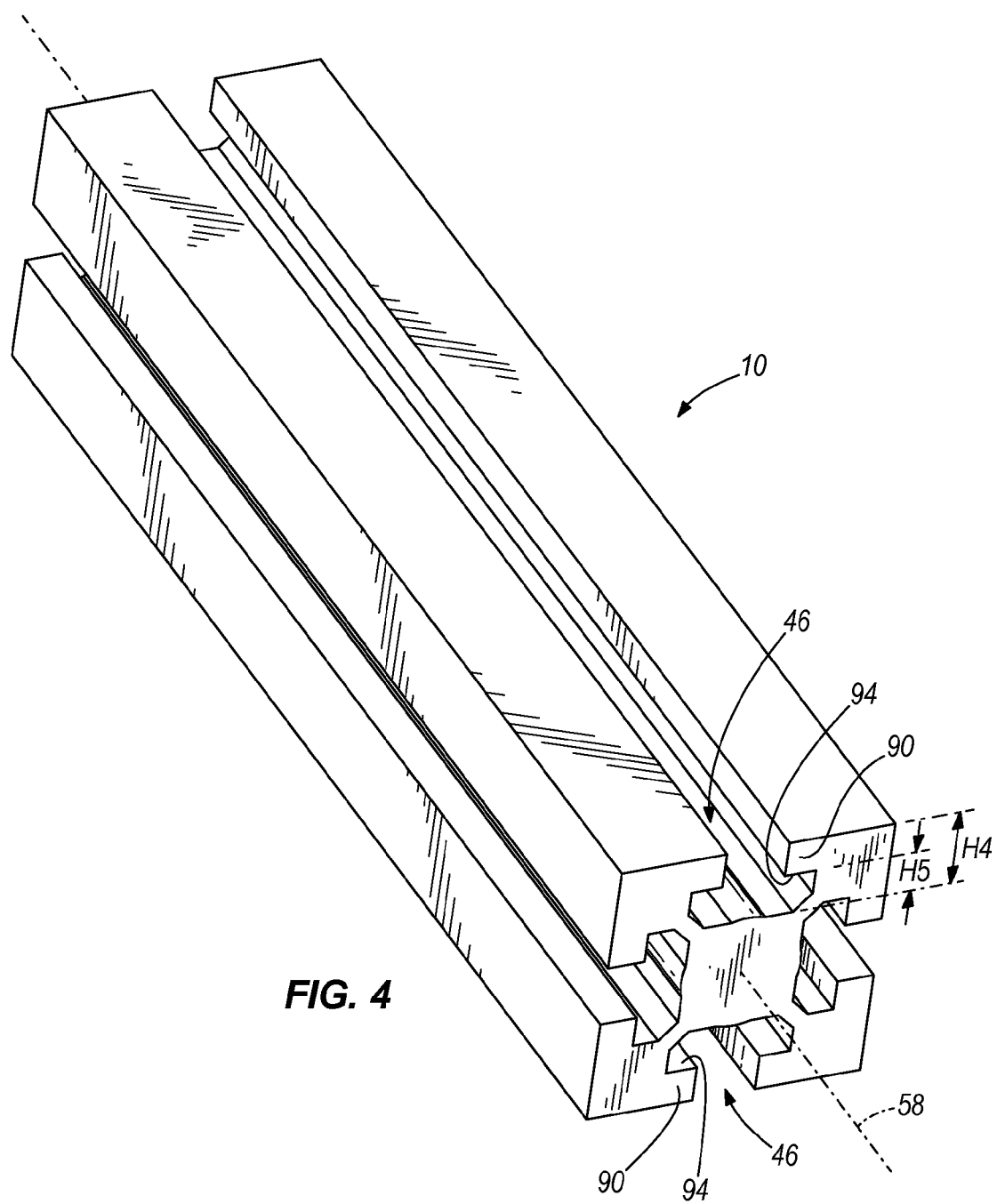
FIG. 4 is a perspective view of a frame member of FIG. 1.

Before explaining the operation of the first embodiment of the present invention in detail, it is important to note the relationship between the connector member 18 and the channel 46 of the first frame member 10. With reference to FIG. 2, the connector member 18 has a generally T-shaped cross-section with an overall height H1 of the body and a height H2 of the flange 50. With reference to FIG. 4, the channel 46 in the first frame member 10 has an overall height H4 and a height H5 of the receiving portion defined between the interior surface 94 and the bottom of the channel 46. The proportions of the connector member 18 are formed such that the connector member 18 may be inserted into the channel 46 of the first frame member 10. The height H1 of the connector member 18 is less than the height H4 of the channel 46 such that no portion of the connector member 18 will extend outside the channel 46 of the first frame member 10 in a direction perpendicular to the longitudinal axis 58 of the first frame member 10 when the connector member 18 is inserted therein. Furthermore, the height H2 of the flange 50 on the connector member 18 is less than the height H5 of the receiving portion of the T-shaped channel 46 such that the fulcrum 34 can be accommodated within the channel 46 and coupled to both the exterior surface 54 defined by the flange 50 of the connector member 18 and the interior surface 94 defined by the flange 90 of the first frame member 10.

The operation of the first embodiment of the present invention will be described in detail with reference to FIGS. 1-6. The connector member 18 is coupled to the tee nut 22 by a fastener 70 (see FIGS. 5 and 6) that extends through the second bore 42 in the connector member 18 and engages the bore 66 in the tee nut 22. The fastener 70 connects the connector member 18 to the tee nut 22 while still allowing the connector member 18 and tee nut 22 to rotate about an axis 98 (see FIG. 1) through the center of the fastener 70.

The connector member 18 is slidably engageable with the channel 46 in the first frame member 10, and the tee nut 22 is slidably engageable with the channel 74 in the second frame member 14, as shown in FIG. 1. Therefore, the first frame member 10 can be moved (e.g. translated) relative to the connector member 18 in either direction along an axis 58 defined longitudinally through the center of the first frame member 10. Similarly, the second frame member 14 can be moved relative to the tee nut 22 in either direction along an axis 86 defined longitudinally through the center of the second frame member 14.

Neither the connector member 18 nor the tee nut 22 extends outside the channels 46, 74 of the frame members 10, 14 in a direction perpendicular to the longitudinal axes 58, 86 of the frame members 10, 14. The connector is fully contained within the channels 46, 74 of the frame members 10, 14, allowing it to connect the frame members 10, 14 internally. Therefore, no modification to the frame members 10, 14 or channels 46, 74 is necessary in order to use the present invention, giving the present invention more flexibility over the prior art requiring drilling or modification of the frame members in order to use the prior art connectors.

When connected, the frame members 10, 14 may each be rotated 0 to 360 degrees about the axis of rotation 98. This degree of flexibility allows the user to connect two frame members 10, 14 lying in substantially parallel planes (e.g., arranged such that the longitudinal axes 58, 86 of the frame members 10, 14 lie in substantially parallel planes) in any angular orientation with respect to the longitudinal axes 58, 86. The user should position the frame members 10, 14 such that the first bore 38 in the connector member 18 is accessible, as shown in FIG. 1.

Once the first and second frame members 10, 14 are positioned in the desired orientation (both translational and rotational), the user tightens the fastener 102 (e.g., a set screw), located in the first bore 38 of the connector member 18. The set screw 102 may be inserted in the first bore 38 of the connector member 18 when the user is ready to lock the frame members 10, 14 together. Alternatively, the set screw 102 may be coupled to the connector member 18 before the connector member 18 is slidably engaged within the channel 46 of the first frame member 10 such that the set screw 102 does not significantly restrict movement of the connector member 18 within the channel 46. Tightening of the fastener 102 will cause the connector member 18 to move from a first pivot position, in which the two frame members 10, 14 are free to move relative to one another, to a second pivot position, in which the two frame members 10, 14 are substantially locked against relative movement, both translational and rotational. The first pivot position and second pivot position will be described in detail with reference to FIGS. 5 and 6 below.

Figure 5:
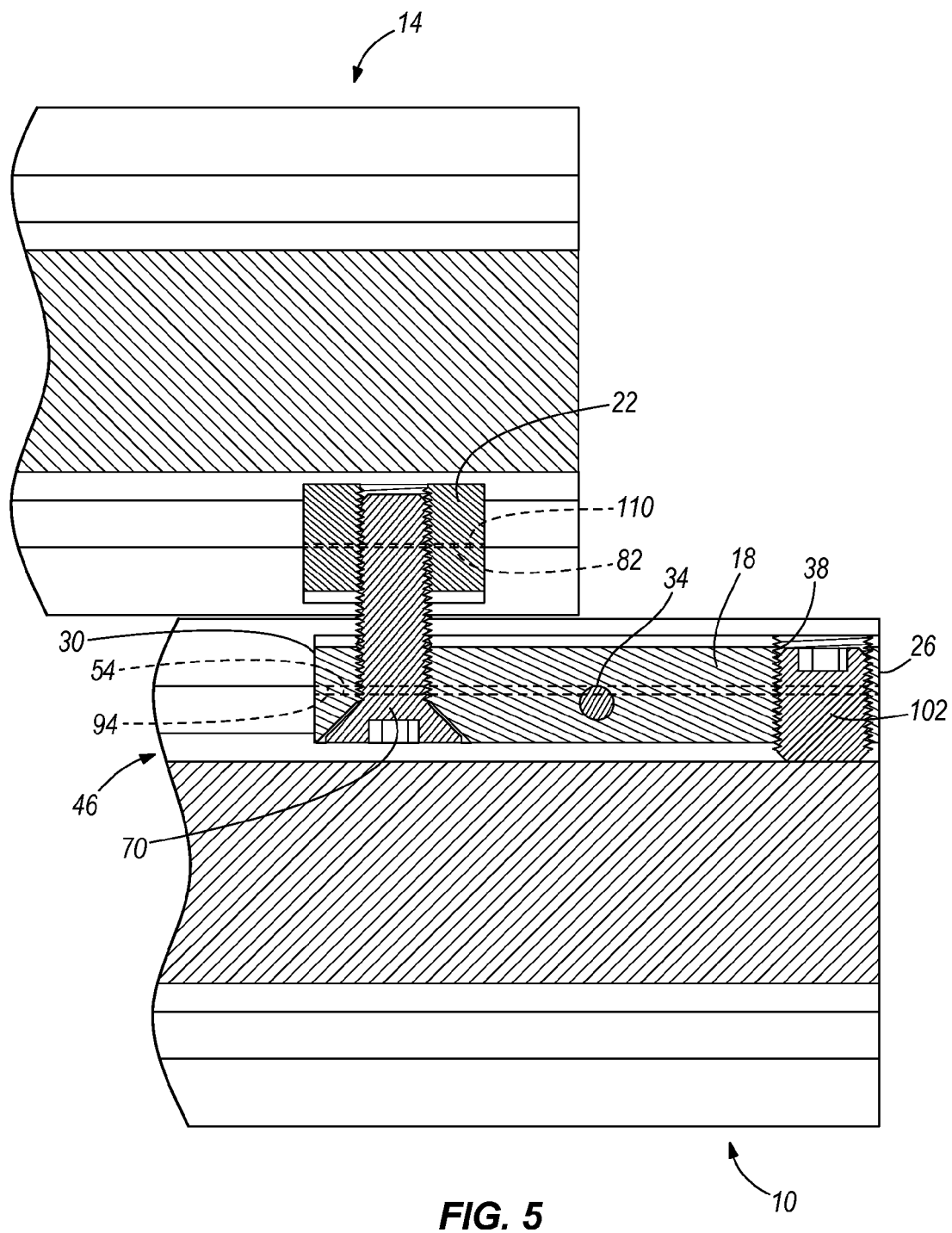
FIG. 5 is a section view along line 5-5 of FIG. 1, illustrating a first pivot position of the connector member of FIG. 1.

As shown in FIG. 5, the set screw 102 has been inserted in the threaded bore 38 of the connector member 18 and tightened to the point at which it is extending out of the bore 38 and is in engagement with the bottom of the channel 46. The connector member 18 is shown to be substantially parallel within the channel 46, indicated by the exterior surface 54 of the connector member 18 being substantially parallel to interior surface 94 of the channel 46. In this position, the connector member 18 is free to translate within the channel 46, and the frictional forces caused by the set screw 102 abutting the bottom of the channel 46 will not significantly inhibit translational movement of the first frame member 10 relative to the connector member 18.

Figure 6:
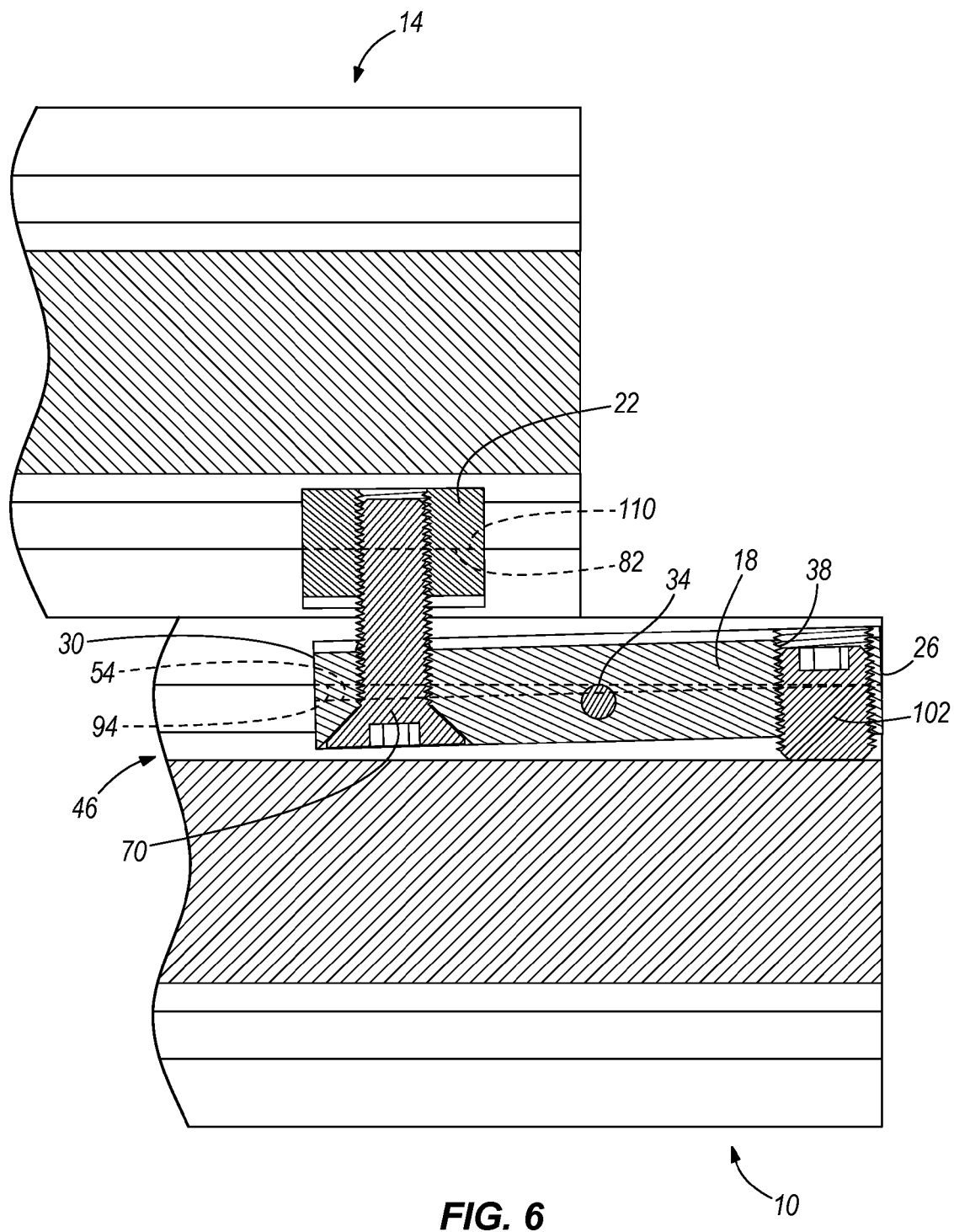
FIG. 6 is a section view similar to FIG. 5, illustrating a second pivot position of the connector member of FIG. 1.

If the user continues to tighten the set screw 102, as shown in FIG. 6, the rotation of the set screw 102 will cause the first end 26 of the connector member 18 to move upward along the threaded portion of the set screw 102. The movement of the first end 26 of the connector member causes the connector member 18 to pivot about the fulcrum 34 within the channel 46. The pivoting of the connector member 18 is illustrated by showing that the exterior surface 54 of the connector member 18 and the interior surface 94 of the channel 46 are closer together at the first end 26 and further apart at the second end 30 of the connector member 18. The pivoting of the connector member 18 allows it to substantially inhibit translational movement of the first frame member 10 relative to the connector member 18 due to the wedging action at the first end 26.

The user can take advantage of the pivoting action of the connector member 18 during assembly of the two frame members 10, 14 by not tightening the set screw 102 as much as possible. The set screw 102 may be tightened to differing degrees according to user preference to cause the connector member 18 to pivot slightly, wedging the connector member 18 in the channel 46 of the first frame member 10. Depending on how much the connector member 18 is pivoted, the wedging action of the connector member 18 can be adjusted to slightly or moderately inhibit movement of the frame member 10 relative to the connector member 18. This may make it easier for the user to make adjustments to the position of the frame member 10. For example, the frame member 10 may generally remain where positioned even though the set screw 102 is not fully tightened if the forces acting on the frame member 10 do not fully overcome the wedging force of the connector member 18 in the channel 46.

Furthermore, the pivoting action of the connector member 18 forces the second end 30 of the connector member 18 in a downward direction (as shown in FIGS. 5 and 6), applying a tensile force to the fastener 70 in the downward direction. Because the fastener 70 is threaded and coupled to the tee nut 22 through a threaded bore 66, the fastener 70 cannot move axially unless it is rotated with respect to the tee nut 22. Therefore, there is not only a force being applied to the fastener 70 in the downward direction (due to the pivoting of the connector member 18) but there is also a reactionary force being applied to the fastener 70 in the upward direction (due to the threaded engagement with the tee nut 22), thus placing the fastener 70 in tension. Although the fastener 70 has been described as a threaded fastener 70, the fastener 70 can be any suitable fastener 70 (e.g., a rivet) that can be used to couple the connector member 18 to the tee nut 22. The threaded portions are not required but clearly allow less axial movement of the fastener 70 prior to being placed in tension.

The tension on the fastener 70 causes the exterior surface 82 defined by the flange 78 of tee nut 22 to be pulled tight against the interior surface 110 defined by the flange 106 of the second frame member 14. This is illustrated by showing a small clearance in FIG. 5 between the exterior surface 82 and the interior surface 110 and by eliminating this clearance in FIG. 6. Without the clearance, the tee nut 22 can no longer slide in the channel 74 of the second frame member 14, substantially inhibiting translational movement of the second frame member 14 relative to the tee nut 22.

The tension applied to the fastener 70 substantially inhibits rotational movement of the frame members 10, 14 by increasing the amount of torsion required to overcome the tension and rotate the connector members 18, 22, and therefore the frame members 10, 14, with respect to each other.

In summary, tightening of the set screw 102 causes the connector member 18 to pivot within the channel 46 in the first frame member 10. The pivoting action causes the connector member 18 to act similar to a wedge and substantially inhibit translational movement of the first frame member 10 relative to the connector member 18. The pivoting of the connector member 18 also places the fastener 70 in tension. This tension causes the tee nut 22 to be pulled tight against the second frame member 14, as described above, eliminating the clearance between the exterior and interior surfaces 82, 110 and substantially inhibiting translational movement of the second frame member 14 relative to the tee nut 22. The tension applied to the fastener 70 substantially increases the amount of torsion required to rotate the connector members 18, 22 with respect to each other, which substantially inhibits rotational movement of the frame members 10, 14, relative to one another. Thus, tightening of the set screw 102 causes the body of the connector member 18 to pivot about the fulcrum 34 within the channel 46 of the first frame member 10 to selectively lock the first and second frame members 10, 14 against relative movement. Readjustment of the frame members 10, 14 is achieved simply by loosening and retightening of the set screw 102 located near the first end 26 of the connector member 18.

The connector and frame members 10, 14 may be assembled in many different sequences, providing the user with additional flexibility. The user may choose to first place the tee nut 22 into the channel 74 of the second frame member 14. Then, the user may couple the connector member 18 to the tee nut 22 using the fastener 70. Finally, the user may slide the first frame member 10 onto the connector member 18 by inserting the connector member 18 into the channel 46 in the first frame member 10. The user may adjust the position of the frame members 10, 14 and tighten the set screw 102 as described above to substantially restrict relative movement (e.g., translational and rotational) between the two frame members 10, 14.

The user may also decide to use a different sequence of events in using the connector. For example, the user may first couple the connector member 18 to the tee nut 22 by inserting the fastener 70 into the second bore 42 of the connector member 18 and the bore 66 of the tee nut 22. Then, the user may slide the connector member 18 into the channel 46 of the first frame member 10 and the tee nut 22 into the channel 74 of the second frame member 14. The user may adjust the frame members 10, 14 with respect to each other and then tighten the set screw 102 until it abuts the first frame member 10. The user may adjust the set screw 102 slightly such that it partially restricts relative movement of the two frame members 10, 14, make slight adjustments, and then fully tighten the set screw 102 until the frame members 10, 14 are substantially locked against relative movement, both translational and rotational. One skilled in the art will realize that there are many ways in which two frame members 10, 14 may be joined using a connector embodying the present invention.

Figure 7:
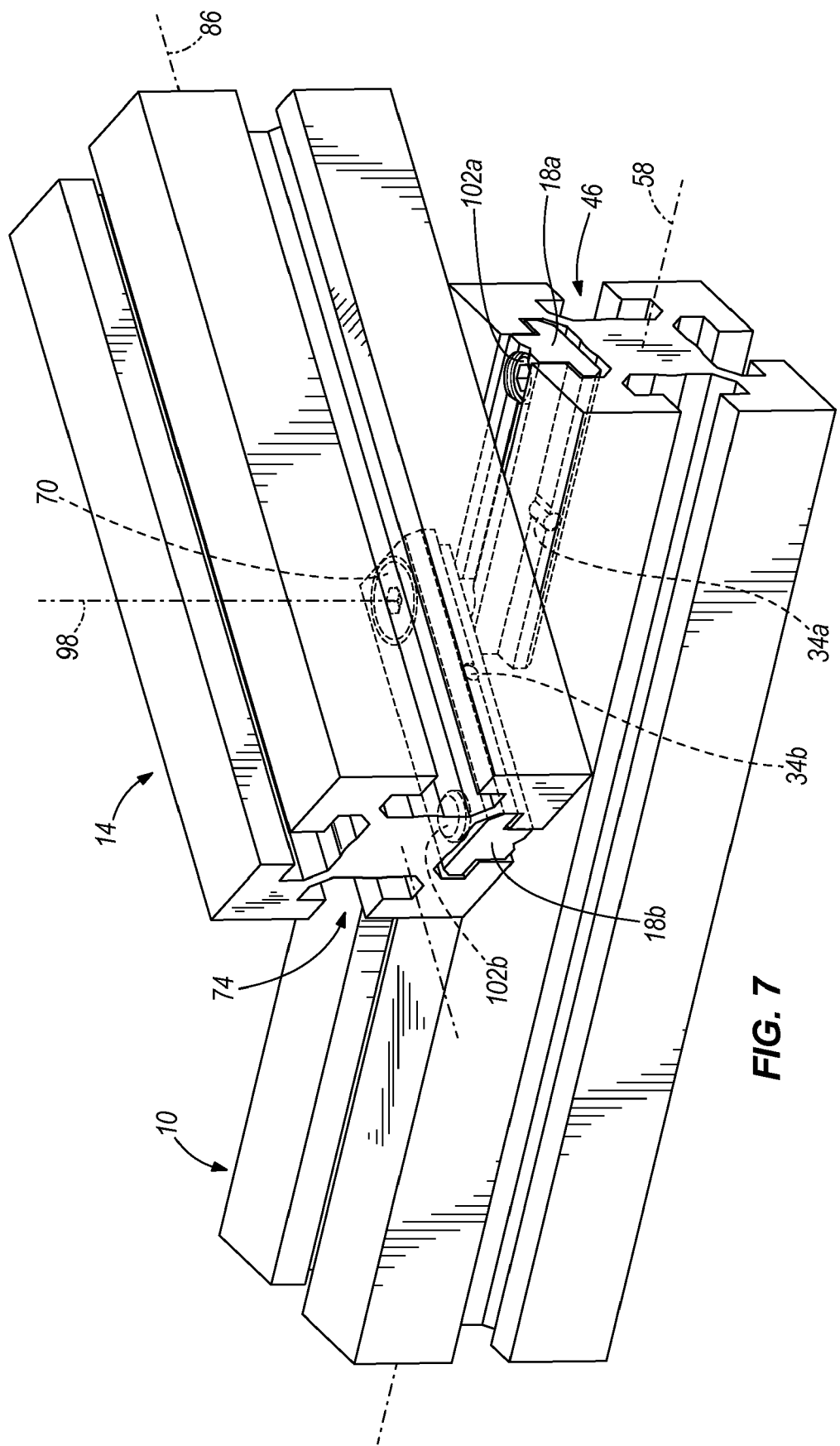
FIG. 7 illustrates a second embodiment of the present invention utilizing two connector members.

FIG. 7 illustrates a second embodiment of the present invention in which two frame members 10, 14 are secured using substantially identical connector members 18a, 18b. The connector members 18a, 18b of the second embodiment are substantially the same as the connector member 18 of the first embodiment described above with respect to FIGS. 1-6. Therefore, the connector members 18a, 18b will not be described again in detail.

The user operates the connector in the same manner as in the first embodiment. The connector members 18a, 18b are coupled together by a fastener 70 and are slidably engageable within the channels 46, 74 of the frame members 10, 14. The frame members 10, 14 may be positioned in any desired orientation such that access to at least one fastener, again referred to as a set screw 102a, 102b, is preserved.

Once the frame members 10, 14 are positioned as desired, the user tightens either of the exposed set screws 102a, 102b located adjacent the first ends 26 of the connector members 18a, 18b. For example, tightening of the set screw 102a coupled to the first connector member 18a, will result in movement of the first connector member 18a from a first pivot position, in which the frame members 10, 14 are free to move with respect to each other, to a second pivot position, in which the frame members 10, 14 are substantially locked against relative movement, both translational and rotational. Similarly, tightening of the set screw 102b coupled to the second connector member 18b, will result in movement of the second connector member 18b from a first pivot position, in which the frame members 10, 14 are free to move with respect to each other, to a second pivot position, in which the frame members 10, 14 are substantially locked against relative movement, both translational and rotational. Therefore, when access to both set screws 102*a*, 102*b* is preserved, it does not matter which set screw 102*a*, 102*b* the user chooses to tighten. In some instances, as further described below, both set screws 102*a*, 102*b* can be tightened. Of course, the user may also choose to arrange the frame members 10, 14 such that access to only one set screw (e.g., 102*a*) is preserved. In such a case, the exposed set screw (e.g., 102*a*) would be tightened to lock the frame members 10, 14 against relative movement.

Readjustment of the frame members 10, 14 in the second embodiment may be achieved by loosening and retightening of at least one of the set screws 102*a*, 102*b*. As previously stated, the user is not required to maintain access to both of the set screws 102*a*, 102*b*. One or the other may remain inaccessible in a desired configuration, and the integrity of the connection is not compromised. The strength of the forces produced to substantially lock the frame members 10, 14 against relative movement does not depend upon which set screw 102*a*, 102*b* is tightened.

The second embodiment of the present invention provides one example of how a connector embodying the present invention may provide additional flexibility over the first embodiment, shown in FIG. 1. For example, the user may choose to tighten one set screw 102*a* until it abuts the first frame member 10. Then, the user may make final adjustments to the orientation of the two frame members 10, 14 before tightening the other set screw 102*b* to substantially lock the frame members 10, 14 against relative movement. One skilled in the art will understand the numerous ways in which a connector embodying the second embodiment of the present invention provides added flexibility to the user.

Figure 8:
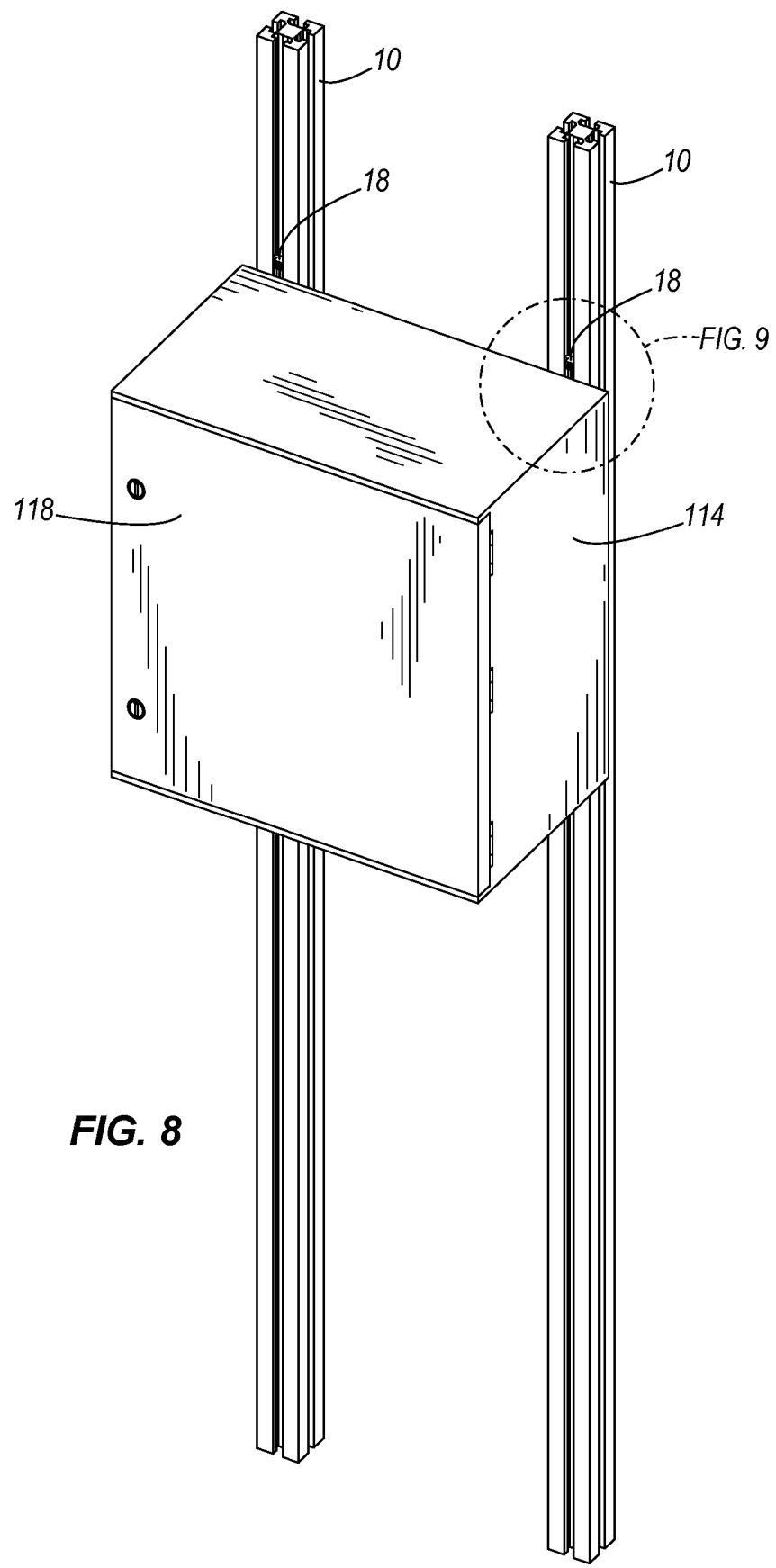
FIG. 8 is a perspective view of an assembly including a connector in accordance with the present invention, the assembly including two frame members, two connector members, and a cabinet.

FIG. 8 illustrates an enclosure member (i.e., another type of frame member) in the form of a cabinet 114 secured to two frame members 10 using a connector embodying the present invention. The cabinet 114 contains a hinged door 118 to provide access to the contents of the cabinet 114. However, in other embodiments, the cabinet 114 may not contain a hinged door 118. For example, it may contain a sliding door, cover, etc. Some cabinets 114 may not contain a door 118 and may be designed to remain either open or closed at all times.

The cabinet 114 contains two threaded bores 126 (see FIG. 9—only one is shown) for the purpose of mounting, as will be described in detail below. In the illustrated embodiment, the threaded bores 126 are formed by fixing a threaded nut 130 to a back wall 122 of the cabinet 114 in alignment with the bore in the back wall 122. The nut 130 may be fixed to the back wall 122 by any reasonable means such as welding, adhesive, etc. In other embodiments, the back wall 122 of the cabinet 114 may be thicker such that a threaded bore may be formed directly in the back wall 122 or the bore in the back wall 122 may be non-threaded, yet engageable with the fastener 70 to secure the fastener 70 in the bore. In yet other embodiments, the threaded bore 126 may be a nut 130 that is not fixed to the back wall 122. Of course, other components may also be used to provide threaded or non-threaded bores 126 for use with the present invention. The cabinet 114 may be provided with standard mounting kits, tabs, brackets, or other mounting devices that may contain threaded or non-threaded bores for use with the invention.

Of course, the threaded bores 126 may also be formed in other walls of the cabinet 114, depending on the desired mounting position of the cabinet 114 with respect to the frame members 10. In some situations, it may be beneficial to mount a cabinet 114 in a corner such that a side wall of the cabinet is mounted to one frame member 10 and the back wall 122 of the cabinet is mounted to a different frame member 10. In other situations, the cabinet 114 may be mounted underneath a frame member 10 such that the top of the cabinet 114 contains the threaded apertures 126 for mounting the cabinet 114 to the frame member 10. Furthermore, washers or other components may be included on either or both sides of the back wall 122.

With reference to FIG. 8, the frame members 10 are shown oriented in a vertically upright position. One connector member 18 is used to couple each side of the cabinet 114 to the corresponding frame member 10, which will be described in detail with reference to FIG. 9. Alternatively, the frame members 10 may be oriented in a horizontal direction or in a different angular configuration, depending on the desired application.

Figure 9:
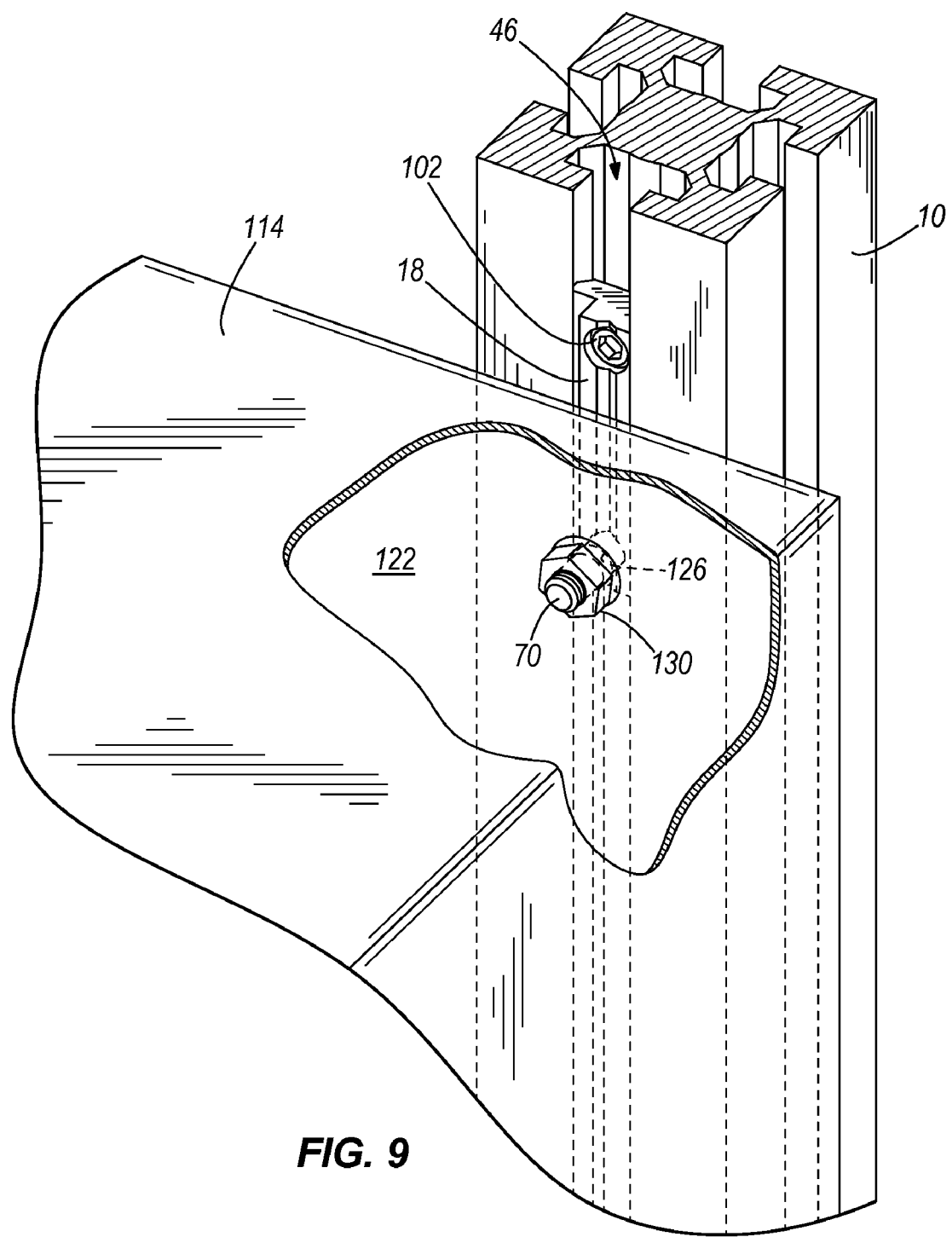
FIG. 9 is an enlarged partial view of a portion of one frame member, one connector member, and the cabinet of FIG. 8, shown with a portion of the cabinet removed for clarity.

With reference to FIG. 9, the first frame member 10 is coupled to the cabinet 114 using only one connector member 18. The operation of the connector member 18 is the same as described above and will not be described again in detail. The fastener 70 extends through the second bore 42 in the connector member 18 and threadably engages the threaded aperture 126 formed by the back wall 122 of the cabinet 114 and the fixed nut 130, as described above. The connector member 18 pivots within the channel 46 in the first frame member 10 in the same manner as described with respect to FIGS. 1-6 by tightening the set screw 102. The pivoting action of the connector member 18 causes the cabinet 114 to be substantially locked against movement (e.g., translational and rotational) relative to the connector member 18 and the frame member 10.

Thus, the connector member 18 may be used to connect two frame members 10, 114 without modification to either of the frame members 10, 114. Furthermore, readjustment of the position of the cabinet 114 does not require opening of the cabinet 114 or removal of the contents inside the cabinet 114. The user simply needs to loosen and tighten the set screw 102, as discussed above, to adjust the location or position of the cabinet 114.

Connectors in accordance with the present invention may be used to connect aluminum profiles (e.g., Bosch Rexroth aluminum profiles) internally, offering better access to add panels and better clearance for other parts. As described above, the frame members 10, 14 do not need to be identical. Two frame members 10, 14 with different sizes of profile may be joined with appropriate fittings. In this way, connector members embodying the present invention may be used as transition connectors between different sized frame members 10, 14. Similarly, connector members in accordance with the present invention may be used to connect frame members 10, 14 of different manufacturers.

Connectors such as those described in the first embodiment offer greater access to the channels 46, 74 in the frame members 10, 14 because the tee nut 22 generally takes up less space than the connector member 18 with a fulcrum 34. Connectors such as those described in the second embodiment, in which both connector members 18*a*, 18*b* contain a fulcrum 34*a*, 34*b*, can provide maximum flexibility because a joint or connection point between two frame members 10, 14 may be adjusted at either side of the joint if access to both fasteners (e.g., set screws 102*a*, 102*b*) is preserved.

As described above, the present invention could also be used with only one connector member 18 by securing the fastener 70 directly into the second frame member 14, 114 without the use of a tee nut 22 or second connector member 18*b*. In particular, the second frame member 14 may be any reasonable structure or enclosure member, such as a cabinet 114, electrical box, watertight box, explosion proof box, etc. In applications where the second frame member 14 contains a threaded aperture 126 in which the fastener 70 may be threadably engaged, no modification to the second frame member 14 would be necessary. Although some embodiments may require machining of the second frame member 14 to include a threaded bore or other receiving mechanism, this method provides additional flexibility to the invention by allowing any two frame members 10, 14, 114 to be connected together.

Various features and advantages of the invention are set forth in the following claims.

What is claimed is:

1. An assembly comprising: a first frame member having a longitudinal axis and including a longitudinally extending channel, the channel defined in part by an interior surface; a second frame member; and a connector member interconnecting the first frame member and the second frame member, the connector member including: a body having a first end and a second end spaced longitudinally from the first end, wherein the body is received within the channel in the first frame member, the body including opposite, laterally extending flanges, each of the flanges defining a planar exterior surface such that the planar exterior surfaces are in facing relation to the interior surface of the channel; and a fulcrum defined on the exterior surfaces of the flanges between the first end and second end, the fulcrum defining a contact surface forming the only discontinuity along the planar exterior surfaces of the flanges, the contact surface comprising a protrusion extending in a direction generally normal to the longitudinal axis that engages the interior surface of the channel, the fulcrum providing a pivot point about which the body pivots within the channel to selectively lock the first and second frame members against relative movement; wherein the fulcrum defines a pivot axis extending generally normal to the longitudinal axis; such that when the body pivots about the fulcrum within the channel to selectively lock the first and second frame members against relative movement, the exterior surfaces engage the interior surface at a location spaced from the fulcrum toward the first end of the body, and the exterior surfaces do not engage the interior surface at any location between the fulcrum and the second end of the body.

2. The assembly of claim 1, wherein the body is pivotable about the fulcrum between a first pivoted position, in which the first and second frame members are movable relative to one another, and a second pivoted position, in which the first and second frame members are substantially immovable relative to one another.

3. The assembly of claim 1, wherein the body further includes:
a first bore adjacent the first end of the body and configured to receive a fastener operable to secure the body relative to the first frame member; and
a second bore adjacent the second end of the body such that the fulcrum is between the first and second bores, the second bore configured to receive a fastener coupled with the second frame member.

4. The assembly of claim 1, wherein the connector member is a first connector member and wherein the assembly further includes a second connector member, the second connector member including
a body configured to be received within a channel in the second frame member; and
a fastener extending from the body and coupled to the first connector member adjacent the second end.

5. The assembly of claim 4, wherein the second connector member is substantially identical to the first connector member.

6. The assembly of claim 4, wherein the body of the second connector member has a substantially constant cross-sectional shape corresponding generally to a cross-sectional shape of the channel of the second frame member.

7. The assembly of claim 1, wherein no portion of the body extends outside the channel of the first frame member in a direction perpendicular to a longitudinal axis through the first frame member.

8. The assembly of claim 1, wherein no modification to the first frame member is required to receive the body of the connector member within the channel.

9. The assembly of claim 1, wherein the second frame member is an enclosure member.

10. The assembly of claim 1, wherein the body further includes a bore configured to receive a fastener operable to secure the body relative to the first frame member and to pivot the connector member about the fulcrum.

11. The assembly of claim 1, wherein the body has a substantially constant cross-sectional shape corresponding generally to a cross-sectional shape of the channel.

12. The assembly of claim 11, wherein the body is substantially T-shaped in cross-section.

13. The assembly of claim 1, wherein the fulcrum includes a pin coupled to the body.

14. A method of connecting two frame members, the method comprising:
providing a first frame member having a longitudinal axis and including a longitudinally extending channel, the channel defined in part by an interior surface; providing a second frame member; providing a connector member, the connector member comprising: a body having a first end and a second end spaced longitudinally from the first end, the body including opposite, laterally extending flanges, each of the flanges defining a planar exterior surface; and a fulcrum defined on the exterior surfaces of the flanges between the first end and second end, the fulcrum defining a contact surface forming the only discontinuity along the planar exterior surfaces of the flanges, the contact surface comprising a protrusion extending in a direction generally normal to the longitudinal axis; wherein the fulcrum defines a pivot axis extending generally normal to the longitudinal axis; inserting the connector member into the channel in the first frame member; such that the contact surface of the fulcrum is in facing relation to the interior surface of the channel; coupling the connector member to the second frame member; and pivoting the connector member about the fulcrum from a first pivot position, in which the frame members are free to move with respect to each other, to a second pivot position, in which the exterior surfaces engage the interior surface at a location spaced from the fulcrum toward the first end of the connector member, and the exterior surfaces and the interior surface do not engage each other at any location between the fulcrum and the second end of the connector member, such that the frame members are substantially locked against relative movement.

15. The method of claim 14, wherein the connector member is a first connector member and wherein coupling the first connector member to the second frame member includes
inserting a second connector member in a channel of the second frame member and,
connecting the first and second connector members together.

16. The method of claim 14, wherein pivoting the connector member is achieved by loosening or tightening a fastener coupled with the connector member.

* * * * *